United States Patent [19]

Gibbemeyer

[11] Patent Number: 5,282,526
[45] Date of Patent: Feb. 1, 1994

[54] APPARATUS AND METHOD FOR ORIENTING CONTAINER PREFORMS

[75] Inventor: Joseph F. Gibbemeyer, Cincinnati, Ohio

[73] Assignee: Cincinnati Milacron Inc., Cincinnati, Ohio

[21] Appl. No.: 952,040

[22] Filed: Sep. 28, 1992

[51] Int. Cl.⁵ .............................................. B65G 47/24
[52] U.S. Cl. ..................................... 198/376; 198/394; 425/534
[58] Field of Search ........................ 198/376–379, 198/394, 395; 425/534

[56] References Cited

U.S. PATENT DOCUMENTS

| | | | |
|---|---|---|---|
| 2,734,619 | 2/1956 | Labombarde | 198/394 |
| 3,311,051 | 3/1967 | Rudolph et al. | 198/377 |
| 3,722,710 | 3/1973 | Ixer et al. | 198/377 |
| 3,997,642 | 12/1976 | Yoshikawa et al. | 264/98 |
| 4,070,140 | 1/1978 | Lucas et al. | 425/533 |
| 4,116,325 | 9/1978 | McDonald | 198/377 |
| 4,212,841 | 7/1980 | Michel | 264/530 |
| 4,451,426 | 5/1984 | Branchadell | 264/535 |
| 4,522,581 | 6/1985 | Schad et al. | 425/534 |
| 4,678,425 | 7/1987 | Gibbemeyer | 425/534 |

*Primary Examiner*—Joseph E. Valenza
*Attorney, Agent, or Firm*—Stephen H. Friskney

[57] ABSTRACT

Apparatus and a method for orienting a container preform in a particular orientation to position a closure thread in a desired position relative to the body of the blown container. The preform is supported by a preform carrier that is rotatably supported in a pallet. A drive motor is engaged with the preform carrier to rotate the carrier and the associated preform, and a pawl is engagable with a notch formed in the closure thread on the preform neck to stop rotation of the preform carrier at a specific circumferential orientation. When the container is subsequently blown at a blowing station, the orientation of the thread start relative to the container body permits attachment of a dispensing closure, or the like, at a desired orientation relative to the container body to facilitate dispensing by a user of a pourable product from within the container.

13 Claims, 4 Drawing Sheets

APPARATUS AND METHOD FOR ORIENTING CONTAINER PREFORMS

BACKGROUND OF THE INVENTION

1. Field of the Invention

The present invention relates to apparatus and a method for orienting a tubular preform to a desired circumferential position before the preform is placed within a blow mold to be blown into a hollow article, such as a container. More particularly, the present invention relates to apparatus and a method for blow molding from a tubular preform a plastic container having a molded-in thread or outwardly extending ridge at the container neck, wherein the thread or ridge includes a gap or notch for permitting circumferential orientation of the preform to a desired position relative to the blow mold.

2. Description of the Related Art

Blow molded containers often include a closure that permits dispensing of a pourable product carried within the container. For example, a closure cap can contain a particular orientation of pouring holes, or a pouring spout, which is desirably oriented in a particular way relative to the container in order to facilitate pouring or dispensing of the product from within the container by a user. In that regard, if the container is of a specific shape to facilitate gripping by the user, such as an oval shape that can optionally include surface depressions or other formations to facilitate gripping or holding of the container, it is desirable that when the container is held for dispensing the product, the dispensing opening is properly positioned relative to the user's hand, so that the dispensing opening is on the distal side of the container, relative to the user, for ease of dispensing.

The notion of providing on a container or on a container preform specific structure to permit orientation of the bottle in a particular position has been suggested before. For example, in U.S. Pat. No. 4,212,841, which issued Jul. 15, 1980, to Edmond Michel, there is disclosed a container preform for blow molding, the preform including a false neck having at least one outwardly extending positioning lug to permit positioning the preform in a particular orientation. The false neck is essentially an appendage that is cut from the container after the completion of the blowing operation.

In U.S. Pat. No. 4,451,426, which issued May 29, 1984, to Jose Branchadell, there is disclosed another form of bottle preform having a false neck. The false neck includes a circular, toothed collar, the teeth of which are engagable by a gear wheel to permit the preform to be rotated by the gear wheel to a predetermined angular position. Again, the false neck is removed after the blowing operation.

The prior art structures described immediately above permit orientation of a preform for subsequent blowing, but because the structure that is used for preform orientation is subsequently removed from the final, blown article, it must be trimmed in a separate operation and then either discarded or recycled, which adds to the costs associated with producing such articles. Additionally, the prior art structures for orienting the preform are unduly complicated.

It is an object of the present invention to overcome the shortcomings of the prior art arrangements.

SUMMARY OF THE INVENTION

Briefly stated, in accordance with one aspect of the present invention, apparatus and a method are provided for orienting a tubular preform having an open, molded neck. The neck carries an outwardly-extending ridge, such as a thread or an annular flange, that includes a molded-in notch or gap. The preform is supported on a preform carrier that is rotatably held on a support pallet that is carried for movement in the blow molding machine by a suitable conveyor structure supported by a machine frame.

The preform carrier is supported for rotation about a preform carrier rotation axis, and it includes a gripping head for securely engaging an inner surface of the neck of the preform. The preform carrier also includes a first clutch element for engagement with a source of rotary power to permit rotation of the preform carrier about its longitudinal axis and relative to the pallet.

A second clutch element, that is selectively cooperable with the first clutch element, is connected with the source of rotary power and extends from the machine frame toward the preform carrier to engage the first clutch element and thereby impart rotation to the second clutch element and consequently also to the preform carrier.

The machine frame carries a pawl arm for pivotal movement about a pawl arm pivot axis. The pawl arm is spaced laterally outwardly from the preform rotation axis and includes a tongue extending outwardly from the pawl arm toward the preform carrier to enable the tongue to be movable relative to the pawl arm pivot axis in a direction toward and away from the preform neck. When the preform is rotated to the desired orientation, the tongue is received in the notch in the preform and the pawl arm is in a first pivotal position to prevent rotational movement of the preform and preform carrier relative to the machine frame. The pawl arm is pivotable to a second pivotal position in which the tongue is displaced radially from the preform neck, to permit rotational movement of the preform and preform carrier relative to the machine frame.

A detector is provided in association with the pawl arm to provide a means of indicating whether or not the tongue of the pawl arm has engaged the notch in the neck of the preform. This indication is used in the machine control to determine when the preform is properly oriented and thus ready for the subsequent processing steps.

In accordance with another aspect of the present invention the pallet carries a preform carrier brake that is operable to engage the preform carrier and to maintain the preform carrier in a desired angular orientation, relative to the pallet, after the preform carrier has been rotated to position the preform in the desired angular position, as indicated by the detector. The preform carrier brake holds the preform carrier in the desired position as the pallet is conveyed through the blow molding machine for subsequent operations.

DESCRIPTION OF THE PREFERRED EMBODIMENTS

Figure 1:
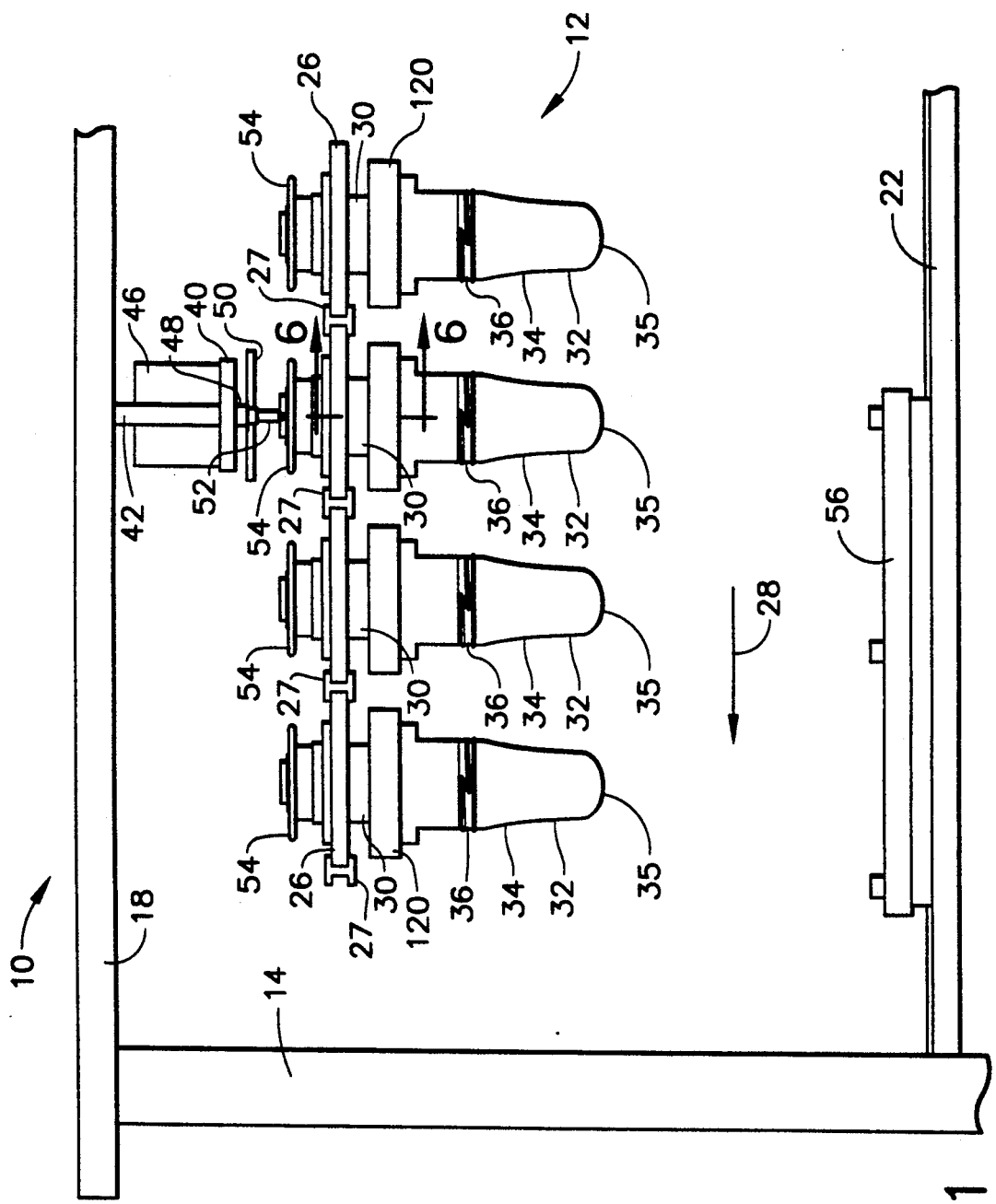
FIG. 1 is a fragmentary side elevational view of a preform orientation station of a blow molding machine in accordance with the present invention.
Figure 2:
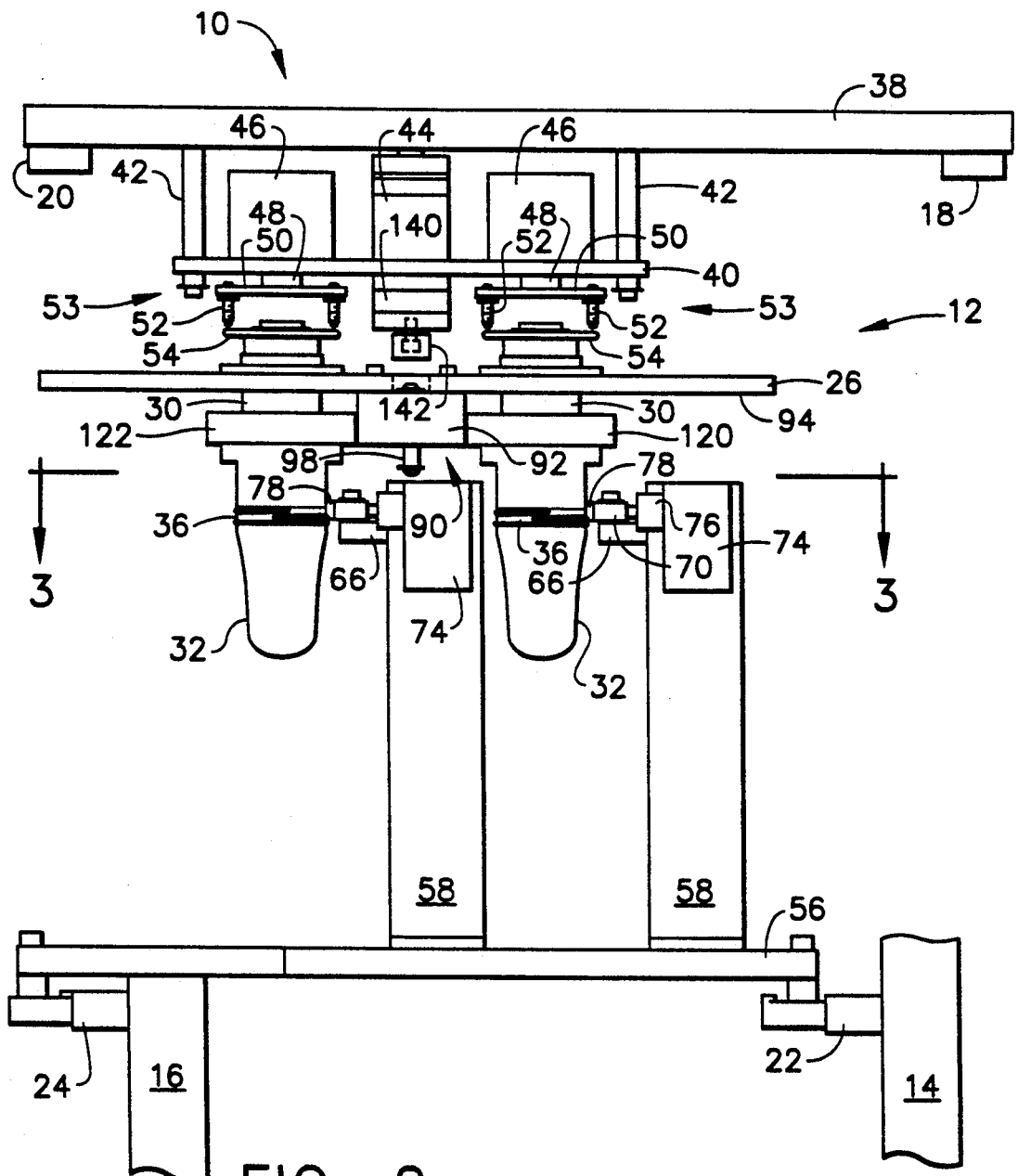
FIG. 2 is a fragmentary end elevational view of the orientation station shown in FIG. 1, as viewed from the left side of FIG. 1.

Referring now to the drawings, and particularly to FIGS. 1 and 2 thereof, there is shown an orientation station 12 of a blow molding machine 10 in accordance with the present invention. As will be appreciated by those skilled in the art, orientation station 12 can be positioned between a preform reheat station (not shown) and a blowing station (not shown) of a known type of reheat blow molding machine, such as the reheat blow molding machine illustrated and described in U.S. Pat. No. 4,382,760, which issued on May 10, 1983, to James G. Wiatt et al., and which is commonly owned by the assignee of the present application. The disclosure of U.S. Pat. No. 4,382,760 is hereby incorporated herein by reference to the same extent as if fully set forth herein.

Blow molding machine includes a plurality of vertical frame members 14, 16, a plurality of upper horizontal frame members 18, 20, and a plurality of lower horizontal frame members 22, 24, all of which are connected together to define a substantially rectangular machine frame.

A plurality of rectangular pallets 26 are provided, each pallet having its longitudinal axis oriented transversely relative to the pallet movement direction indicated by arrow 28 in FIG. 1. Pallets 26 each rotatably carry a pair of side-by-side preform carriers 30, the preform carriers each having their longitudinal axes extending substantially perpendicularly to the pallet movement direction indicated by arrow 28. Adjacent pallets 26 are separated from each other by pallet guides 27 that extend transversely relative to the pallet movement direction 28 and that have an I-shaped cross section.

Each preform carrier is adapted to carry a tubular preform 32, each such preform preferably including a tubular body 34 having a closed end 35 and an open end defined by a neck 36. The structure of pallets 26 and of preform carriers 30 can be in accordance with the apparatus illustrated and described in U.S. Pat. No. 4,678,425, which issued Jul. 7, 1987, to Joseph F. Gibbemeyer, and which is commonly owned by the assignee of the present application. The disclosure of U.S. Pat. No. 4,678,425 is hereby incorporated herein by reference to the same extent as if fully set forth herein.

Suspended from an upper cross member 38 that is carried by upper horizontal frame members 18 and 20 is a transversely extending preform drive motor support plate 40 that is connected to cross member 38 by a pair of transversely spaced, vertically extending plate guide rods 42. Motor support plate 40 is vertically movable along guide rods 42 by a first linear actuator 44 carried by upper cross member 38. Linear actuator 44 can be a pneumatic or an hydraulic cylinder.

Motor support plate 40 carries a pair of laterally spaced preform carrier drive motors 46, which can be electric motors, or the like. Each motor 46 has a drive shaft that extends vertically through motor support plate 40 and is connected with a respective slip clutch 48. A drive disk 50 is connected with slip clutch 48 and includes a plurality of radially outwardly spaced, downwardly extending pins or plungers 52 that define a drive element 53 of a clutch structure.

Each preform carrier 30 includes a driven element 54 of the clutch structure. Driven element 54 is in the form of a toothed sprocket wheel, or the like, that is positioned at the uppermost portion of the preform carrier and is coaxial with the preform carrier axis. Apertures or recesses are provided in driven element 54, and they can be either peripherally positioned or interiorly positioned in driven element 54, and are so configured and arranged as to slidably receive drive pins 52 carried by drive disk 50.

Engagement of drive element 53 with driven element 54 is provided by vertically moving motor support plate 40 downwardly along guide rods 42 by means of linear actuator 44. The downward movement of plate 40 permits drive element 53 to engage with driven element 54 to thereby permit the transfer of rotary power from drive motors 46 to the respective preform carriers to rotate the preform about its longitudinal axis.

Figure 3:
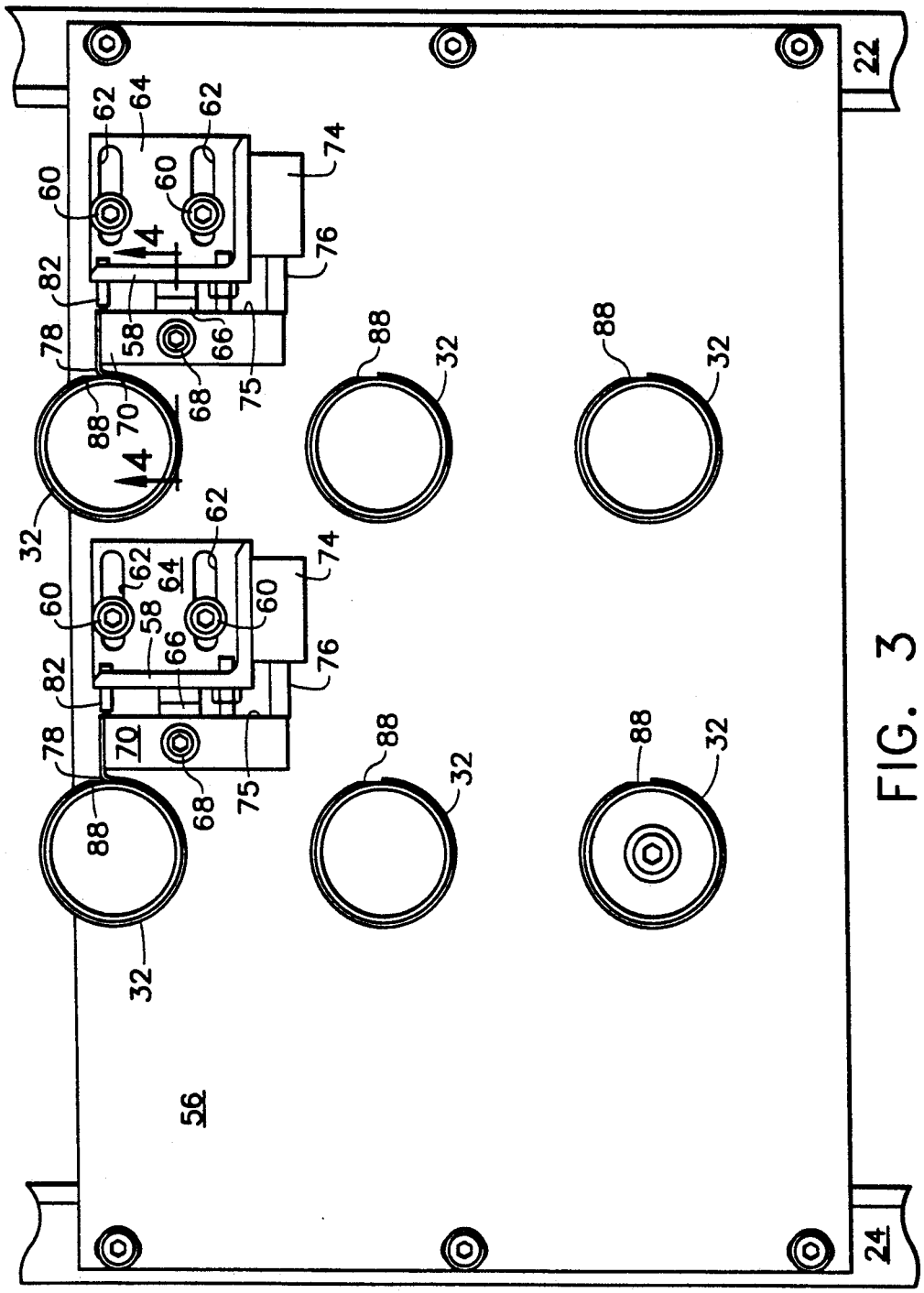
FIG. 3 is a plan view of the orientation station taken along the line 3—3 of FIG. 2, showing a positioning pawl engaged with a notch in the periphery of a closure thread formed in the neck finish of a tubular preform.

Referring now to FIGS. 2 and 3, a pawl support plate 56 is provided at preform orienting station 12. Plate 56 is securely supported by horizontal support members 22 and 24. Extending upwardly from pawl support plate 56 are a pair of laterally spaced pawl mounting brackets 58. As best seen in FIG. 3, pawl mounting brackets 58 are vertically extending angle members that are secured to pawl support plate 56 by connecting bolts 60 that pass through elongated slots 62 formed in the transverse base 64 of pawl mounting brackets 58 to permit the brackets to be slidably positioned to a desired transverse position, relative to a respective preform carrier axis.

Figure 4:
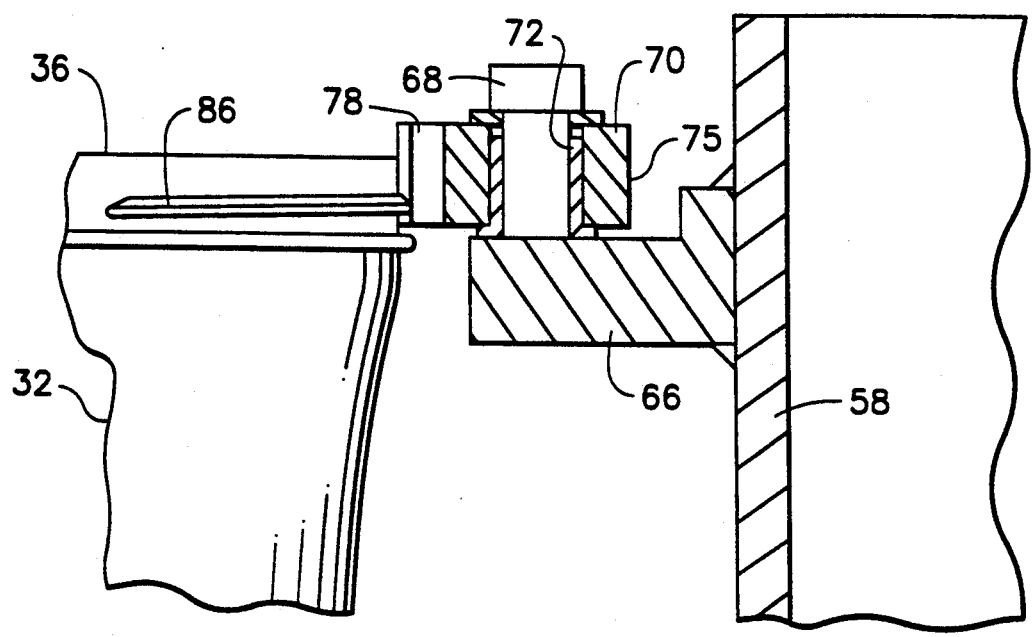
FIG. 4 is an enlarged, fragmentary view taken along the line 4—4 of FIG. 3.

As best seen in FIGS. 3 and 4, pawl mounting brackets 58 each include a pawl support arm 66 that extends laterally toward the axis of the respective preform carrier 30. Support arm 66 carries a pivot pin 68 and a pawl 70 that includes a sleeve bearing 72. Pawl 70 is essentially a lever that is pivotable about a vertical pivot axis defined by pawl pivot pin 68.

As shown in FIG. 3, pawl mounting brackets 58 each carry a proximity switch 74 that extends from bracket 58 to contact a rear face 75 at a point spaced from pawl pivot pin 68. Proximity switch 74 can be a conventional momentary switch and includes an axially movable plunger 76 that contacts pawl rear face 75. When plunger 76 is fully extended it operates to provide an indication that an extending tongue 78 of pawl 70 is not received in the notch 88 in the neck 36 of preform 32 and, therefore, that the preform 32 is not yet properly oriented. The desired actuation of the proximity switch 74 in response to the position of the tongue 78 is accomplished by positioning the pawl pivot point between the tongue 78 and proximity switch 74.

A spring-biased plunger 82 is carried by pawl support bracket 58 at a point opposite from the end of pawl 70 from which tongue 78 extends. Plunger 82 contacts rear face 75 of pawl 70 at a point substantially opposite from tongue 78 and serves to bias pawl 70 so that tongue 78 is urged toward the preform carrier axis and into contact with neck 36. As shown in FIGS. 2 and 3, two such pawl structures are provided, in side-by-side relationship, each of which is cooperably engagable with one of the two preforms carried by a preform pallet 26 when the pallet is in position at preform orienting station 12.

Figure 5:
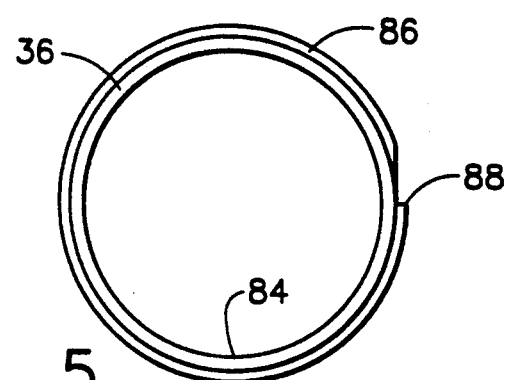
FIG. 5 is a top plan view of a preform neck showing a peripheral thread or an outwardly extending flange having a preform positioning notch.

The outer end of tongue 78 is adapted to be received in and to engage a notch 88 formed in neck 36 of preform 32. As shown in FIG. 5, preform neck 36 is of tubular form and defines an opening 84. Carried on the outer surface of neck 36 is an external helical thread 86 to permit the attachment of a suitable closure or dispensing device (not shown) to the container that is blown from preform 32. Helical thread includes an inwardly extending notch 88, with which tongue 78 is engagable. Alternatively, instead of an external thread, neck 36 can carry an outwardly extending peripheral flange, to which a dispensing closure (not shown) or the like can be attached. In that event the flange includes a notch similar to notch 88.

Figure 6:
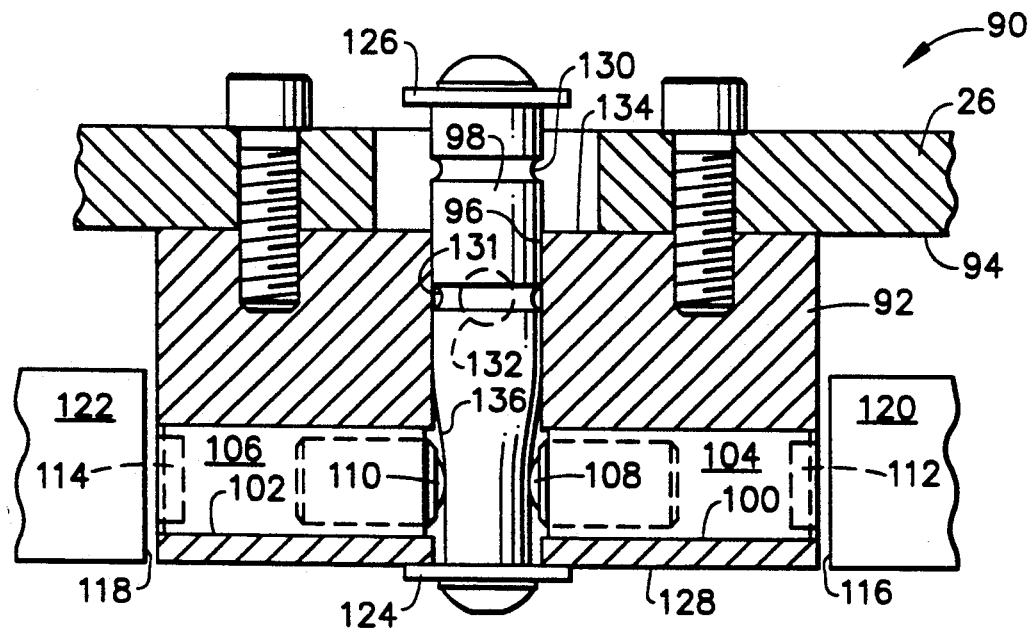
FIG. 6 is a fragmentary cross-sectional view of a preform carrier brake assembly, taken along the line 6—6 of FIG. 1.

Referring once again to FIG. 2, positioned between the respective preform carriers 30 carried on a given pallet 26 is a brake assembly 90 that serves to maintain preform carriers 30 in a desired oriented position as pallets 26 continue their movement from orienting station 12 to the blow molding station (not shown). Each pallet 26 includes a brake housing 92 that is bolted or otherwise secured to the downwardly facing surface 94 of pallet 26. As best seen in FIG. 6, brake housing 92 includes a central passageway 96 that slidably receives a cylindrical brake plunger 98. Extending laterally from central passageway 96 are a pair of opposed, aligned brake pin passageways 100, 102 that each extend from central passageway 96 to the outer lateral surface of brake housing 92 at points opposite a pair of respective preform carriers. Each brake pin passageway 100, 102 slidably carries a respective brake pin 104, 106, each pin having an inner end that faces the outer surface of brake plunger 98. Each brake pin 104, 106 carries a respective contact ball 108, 110 for rolling contact with the outer surface of brake plunger 98. The radially outermost faces of brake pins 104, 106 each include a respective resilient pad 112, 114 that is adapted to come into frictional engagement with the outer surfaces 116, 118 of preform carrier flanges 120, 122 carried by respective adjacent preform carriers.

Brake plunger 98 includes a lower stop flange 124 and an upper stop flange 126 to limit axial movement of plunger 98 within brake plunger passageway 96. As shown in FIG. 6, brake plunger 98 is in its uppermost position, with lower stop flange abutting the lower face 128 of brake housing 92. Additionally, as also seen in FIG. 6, brake plunger 98 includes an upper peripheral groove 130 and a substantially centrally positioned peripheral groove 131 that is spaced axially along brake plunger 98 from upper groove 130. Each of grooves 130, 131 is selectively cooperable with a spring biased detent ball 132 that is carried in brake housing 92 for releasably holding brake plunger 98 in a desired axial position.

When brake plunger 98 is in its uppermost position (the position shown in FIG. 6) detent ball 132 is partially received in groove 131 to hold plunger 98 in the position shown. When brake plunger 98 is shifted axially downwardly within passageway 96 so that upper stop flange 126 contacts upper surface 134 of brake housing 92, detent ball 132 is partially received in groove 130 to hold plunger 98 in its lowermost position.

As also seen in FIG. 6, brake plunger 98 has an inwardly tapered section 136 in that it has a smaller diameter adjacent lower stop flange 124 and tapers upwardly and outwardly therefrom to a uniform size at an axial position about 2/3 the axial distance between lower stop flange 124 and groove 131. Thus, when the brake plunger is moved in a downward direction, from the position shown in FIG. 6, the taper of the plunger body exposes a gradually larger diameter portion of plunger 98 to contact balls 108 and 110 to cause the respective brake pins to move laterally outwardly and to come into contact with the adjacent preform carrier flanges to thereby prevent rotational movement of the preform carriers. In that regard, the brake plunger is shown in its lowermost position in FIG. 2.

Downward axial movement of brake plunger 98 is effected by a linear actuator 140 carried on the lower face of drive motor support plate 40. Actuator 140 includes a bumper 142 that is adapted to contact the upper end surface of plunger 98 and to urge plunger 98 downwardly to cause the braking arrangement to hold the respective preform carriers in a desired circumferential orientation. After the preform has been blown into the desired article and has been withdrawn from the blow mold, brake plunger 98 can be returned from its lowermost, brake-engaging position to its uppermost, brake-released position by a suitable camming surface (not shown) carried by the machine frame and over which the pallets are conveyed after they leave the blowing station.

In operation, circumferential orientation of the respective preforms is accomplished by transporting pallets 26 and their respective preform carriers 30 successively from the reheat station (not shown) to orientation station 12 so that pallets 26 are sequentially received at the orientation station and their respective preform carriers 30 are positioned immediately below the respective preform drive motors 46. If the preform is not properly oriented (as is generally the case), the tongue 78 will be displaced radially outward by the threads 86 on the neck 36 of preform 32. The resulting position of pawl 70 will allow the plunger 76 of switch 74 to move to its fully extended position, indicating that each of the preforms 32 is not properly oriented.

Actuator 44 is operated to shift drive motor mounting plate 40 and associated drive motors 46 downwardly so that pins 52 carried by the respective pin disks 50 constituting drive elements 53 are brought into engagement with respective apertures or circumferential notches provided in driven elements 54 carried by the respective preform carriers 30. The rotation provided by drive motors 46 is thus imparted to preform carriers 30, and as the preforms 32 contained therein are rotated, the spring action of spring biased plungers 82 urges the tongues 78 of respective pawls 70 against threads 86 formed in the necks of the respective preforms. When the tongues 78 engage with the notches 88 provided in the threads 86, further rotation of the preforms is prevented and movement of plunger 76 operates switch 74 to provide an indication that the associated preform 32 is properly oriented. Although drive motors 46 continue to rotate, slip clutches 48 permit the associated drive elements to remain stationary. When the switches 74 indicate that both of the preforms 32 are properly oriented, actuator 44 is retracted to shift drive motor mounting plate 40 and associated drive motors 46 upwardly so that drive elements 53 disengage the driven elements 54 carried by the respective preform carriers 30.

Once the preforms have been oriented in the desired circumferential position, actuator 140 is operated to lower bumper 142 into contact with brake plunger 98 to thereby urge brake pins 104 and 106 radially outwardly within their respective brake pin passageways so that resilient pads 112, 114 engage the outer edges of preform carrier flanges 120, 122 to hold the respective preform carriers 30 in the desired oriented position. Consequently, as the respective pallets are conveyed away from orientation station 12, preform carriers 30 are maintained in the desired circumferential position of orientation as the pallets are conveyed to the blowing station (not shown) for performance of the blow molding operation. As a result of the preform orientation herein disclosed, the thread starts of the respective preforms are so oriented that a closure or dispensing member can be attached in proper operative alignment relative to the blow molded container body to facilitate dispensing of product from within the container.

It can thus be seen that the present invention provides a simple, convenient, and rapid way of orienting a bottle preform relative to a preform carrier and pallet, so that the preform is in a desired position when the article is ultimately blown in a blow mold contained at a blow molding station of the machine.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. Apparatus for circumferentially orienting a tubular preform relative to a preform carrier, the preform having a molded neck that includes a molded-in notch, said apparatus comprising:
   a. a frame;
   b. a support pallet adapted for movement in a preform movement direction along the frame;
   c. a preform carrier rotatably carried by the support pallet for rotation about a preform rotation axis, the preform carrier adapted to carry securely and releasably a tubular preform, the preform carrier including a driven element for releasable engagement with a cooperating, driving element supported by the frame for engagement with the driven element for imparting rotation to the preform carrier about a preform carrier rotation axis;
   d. a pawl arm carried by the frame for pivotal movement about a pawl arm pivot axis extending parallel with and spaced laterally from the preform carrier rotation axis, the pawl arm including an outwardly extending tongue positioned for selective engagement with the molded-in peripheral notch of the preform for stopping rotation of the preform at a desired circumferential position, the tongue being pivotable about the pawl arm pivot axis toward and away from the preform carrier to enable the tongue to be received in the molded-in notch in the preform when the pawl arm is in a first pivotal position to thereby prevent rotational movement of the preform carrier, and to enable the tongue to be displaced radially from the molded-in notch when the pawl arm is in a second pivotal position; and
   e. a detector including a plunger member engagable with the pawl arm for actuating a switch member, the detector providing an indication of whether or not the pawl arm has engaged the peripheral notch of the preform, thus indicating whether the desired orientation of the preform notch relative to the support pallet has been achieved.

2. Apparatus as claimed in claim 1 wherein the driven element includes at least one clutch notch and the driving element includes at least one pin engagable with the clutch notch for driving engagement of the clutch elements.

3. Apparatus in accordance with claim 2 wherein the driven element includes a plurality of clutch notches and the driving element includes a plurality of pins engagable with respective ones of the clutch notches.

4. Apparatus in accordance with claim 1 including a drive motor carried by the frame and drivingly connected with the driving element.

5. Apparatus in accordance with claim 1 wherein the pawl arm pivot axis lies intermediate the tongue and the point where the plunger member engages the pawl arm.

6. Apparatus in accordance with claim 1 wherein the pawl arm is spring biased toward the preform carrier for engagement with a preform notch.

7. Apparatus for circumferentially orienting a tubular preform relative to a preform carrier, the preform having a molded neck that includes a molded-in notch, said apparatus comprising:
   a. a frame;
   b. a support pallet adapted for movement in a preform movement direction along the frame;
   c. a preform carrier rotatably carried by the support pallet for rotation about a preform rotation axis, the preform carrier adapted to carry securely and releasably a tubular preform, the preform carrier including a driven element for releasable engagement with a cooperating, driving element supported by the frame for engagement with the driven element for imparting rotation to the preform carrier about a preform carrier rotation axis;
   d. a pawl arm carried by the frame for pivotal movement about a pawl arm pivot axis extending parallel with and spaced laterally from the preform carrier rotation axis, the pawl arm positioned for selective engagement with the molded-in peripheral notch of the preform for stopping rotation of the preform at a desired circumferential position;
   e. a detector for providing an indication of whether or not the pawl arm has engaged the peripheral notch of the preform, thus indicating whether the desired orientation of the preform notch relative to the support pallet has been achieved; and
   f. a brake carried by the pallet for selective engagement with the preform carrier for holding the preform carrier in a selected rotational position after the preform notch has been oriented to the desired circumferential position.

8. Apparatus in accordance with claim 7 wherein the brake includes at least one braking member that is laterally offset from the preform axis and is movable laterally toward and away from the preform carrier to engage with a flange carried by the preform carrier.

9. Apparatus in accordance with claim 8 wherein the brake includes an actuating member engagable with the braking member for laterally moving the braking member into engagement with the preform carrier.

10. Apparatus in accordance with claim 9 wherein the actuating member is movable in a direction perpendicular to the direction of movement of the braking member.

11. Apparatus in accordance with claim 9 wherein the actuating member includes at least one circumferential groove and the brake includes a housing within which the actuating member is slidably carried, the housing including a detent engagable with the groove for holding the actuating member in a predetermined position.

12. Apparatus in accordance with claim 8 wherein the braking member carries a resilient pad that is engagable with the preform carrier.

13. A method for orientating a tubular preform in a desired circumferential position, said method comprising the steps of:
  a) rotating a preform carrier and a tubular preform contained therein, the preform having a peripheral positioning notch;
  b) interrupting the rotation of the preform carrier by engaging a pawl in the positioning notch to stop rotation of the preform carrier at a desired circumferential position of the positioning notch;
  c) providing an indication of the engagement of the pawl in the positioning notch of the preform; and
  d) applying a brake to engage the preform carrier and hold the preform carrier in the stopped position.

* * * * *